United States Patent
Potteiger et al.

[11] Patent Number: 6,007,018
[45] Date of Patent: Dec. 28, 1999

[54] SPOOL SUPPORT ASSEMBLY FOR THE OPTICAL FIBER OF A LASER MODULE

[75] Inventors: Brian Dale Potteiger, Reading; Rory Keene Schlenker, Lenhartsville, both of Pa.

[73] Assignee: Lucent Technologies Inc., Murray Hill, N.J.

[21] Appl. No.: 09/173,101

[22] Filed: Oct. 15, 1998

[51] Int. Cl.⁶ ................................. B65H 16/04
[52] U.S. Cl. ........................ 242/597.5; 242/400.1; 242/402; 242/406
[58] Field of Search ............ 242/592.5, 400.1, 242/402, 405.1, 406, 407

[56] References Cited

U.S. PATENT DOCUMENTS

| | | | |
|---|---|---|---|
| 2,201,305 | 5/1940 | Springer | 242/407 |
| 2,816,718 | 12/1957 | Chewning | 242/400.1 |
| 3,249,318 | 5/1966 | Wormser | 242/400.1 |
| 3,476,331 | 11/1969 | Green, Jr. et al. | 242/400.1 |
| 4,061,290 | 12/1977 | Harrill | 242/96 |
| 4,150,798 | 4/1979 | Aragon | 242/100.1 |
| 4,429,839 | 2/1984 | Jessamine | 246/96 |
| 4,669,814 | 6/1987 | Dyott | 350/96.15 |
| 4,688,740 | 8/1987 | Weeks et al. | 242/96 |
| 4,784,454 | 11/1988 | Dyott | 350/96.2 |
| 4,862,635 | 9/1989 | Conte | 43/57.1 |
| 5,486,922 | 1/1996 | Cordova | 356/350 |
| 5,727,745 | 3/1998 | Vara | 242/400.1 |

FOREIGN PATENT DOCUMENTS 9001821 2/1990 WIPO ................. 242/405.1

Primary Examiner—Donald P. Walsh
Assistant Examiner—Minh-Chau Pham
Attorney, Agent, or Firm—Gibbons, Del Deo, Dolan, Griffinger & Vecchione

[57] ABSTRACT

An assembly that assists in the winding of an optical fiber of a laser module around a spool. The assembly contains a spool support that holds the spool as the optical fiber is wound around the spool. The spool support has a top surface with opposing side edges. The top surface of the spool support has a periphery, wherein the top surface of the spool support is beveled between its peripheral edge and the groove. The presence of the bevel helps to guide the optical fiber onto the spool as the optical fiber is wound around the spool. A generally circular groove is disposed in the top surface of spool support, wherein the groove at least partially intersects the opposing side edges of the top surface. As a result, when the spool is attached to the spool supports, opposite sides of the spool protrude beyond the sides of the spool support. As the optical fiber is wound around the spool, the areas of protrusion make it possible for a person to engage the wound spool and hold it in place on the spool as the spool is removed from the spool support.

14 Claims, 4 Drawing Sheets

SPOOL SUPPORT ASSEMBLY FOR THE OPTICAL FIBER OF A LASER MODULE

RELATED APPLICATIONS

This application is related to co-pending U.S. patent application Ser. No. 09/173,283, filed Oct. 15, 1998, and entitled, Device And Method For Retaining A Laser Module In An Orientation Suitable For Testing And Shipping (Potteiger 7-1-3).

BACKGROUND OF THE INVENTION

1. Field of the Invention

The present invention relates to devices and tools that assist in the winding of a line around a spool. More particularly, the present invention relates to devices that assist the manual winding of an optical fiber onto a spool.

2. Description of the Prior Art

There are many different applications that utilize optical fibers. In an optical fiber system, a laser source is typically used to generate a light signal. The light signal is then propagated through an optical fiber that is attached to the laser source.

In the telecommunications industry, solid state laser sources are commonly manufactured and sold as part of premanufactured module assemblies. In these modules, a solid state laser is attached to a segment of optical fiber. The optical fiber terminates at its free end with some type of fiber optic connector. In this manner, the laser module can be readily integrated into an existing electro-optical system. An example of such a laser module is the Laser 2000 Module, manufactured and sold by Lucent Technologies of Murray Hill, N.J., the assignee herein.

In co-pending U.S. patent application Ser. No. 09/172, 283, filed Oct. 15, 1998, a support device for a laser module is disclosed. The support device contains a baseplate onto which can be attached a removable spool. The baseplate retains the solid state laser and optical connector of the laser module. The spool retains the optical fiber that interconnects the solid state laser to the optical connector.

In the use of such a laser module support device, it is difficult to manually wind the optical fiber around the spool without the optical fiber either unwinding from the spool or falling away from the spool. It is also highly labor intensive and time consuming to manually wind the optical fiber around such a spool. A need therefore exists for an assembly that can assist a person wind the optical fiber of a laser module around a spool.

SUMMARY OF THE INVENTION

The present invention is an assembly that assists in the winding of an optical fiber of a laser module around a spool. The assembly contains a spool support that holds the spool as the optical fiber is wound around the spool. The spool support has a top surface with opposing side edges. The top surface of the spool support has a periphery, wherein the top surface of the spool support is beveled between its peripheral edge and the groove. The presence of the bevel helps to guide the optical fiber onto the spool as the optical fiber is wound around the spool. A generally circular groove is disposed in the top surface of the spool support, wherein the groove at least partially intersects the opposing side edges of the top surface. As a result, when the spool is attached to the spool supports, opposite sides of the spool protrude beyond the sides of the spool support. As the optical fiber is wound around the spool, the areas of protrusion make it possible for a person to engage the wound spool and hold it in place on the spool as the spool is removed from the spool support.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention device and method can be used to help wind many different types of flexible elements around different types of spools, the present invention is particularly useful in the winding of the optical fiber of a laser module around a dedicated spool. Accordingly, by way of example, the present invention device and method will be described within the context of winding the optical fiber of a laser module.

Figure 1:
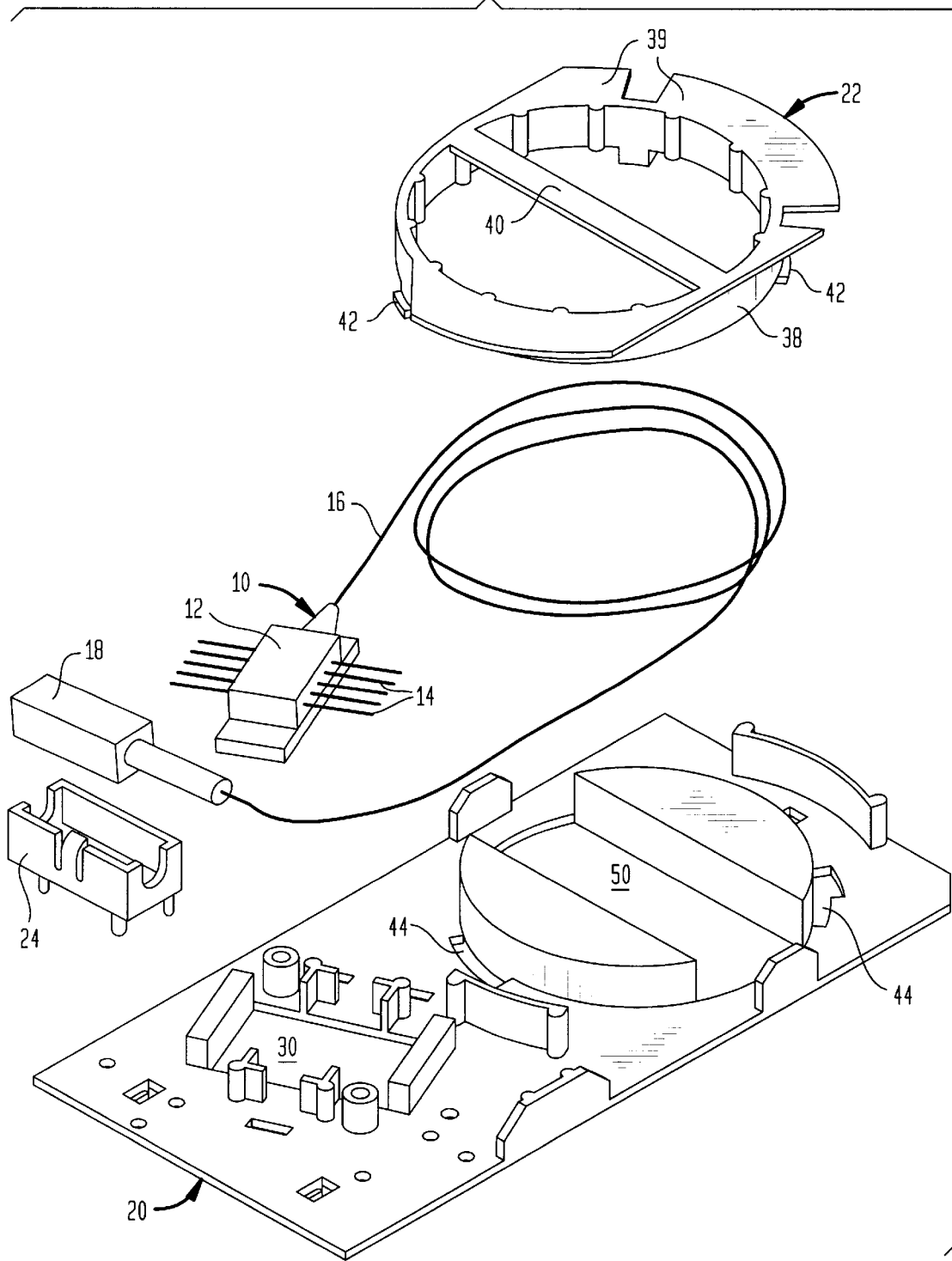
FIG. 1 is an exploded view of an exemplary embodiment of a laser module shown in conjunction with a testing support device.

Referring to FIG. 1, a prior art laser module 10 is shown. The laser module 10 is a Laser 2000 Module manufactured by Lucent Technologies, the assignee herein. The shown laser module 10 contains a solid state laser 12. The laser 12 itself has multiple conductive leads 14 that extend outwardly from opposing sides of the solid state laser 12. The conductive leads 14 are used to both power and control the laser 12 during its operation. The conductive leads 14 are also used to power, control and test the laser 12 during its manufacture.

An optical fiber 16 extends from the solid state laser 12. The optical fiber 16 receives the laser light generated by the solid state laser 12 and propagates that light to its free end. The optical fiber 16 can be of any length. However, in many applications the length of the optical fiber 16 is typically less than 80 inches. The free end of the optical fiber 16 terminates with an optical connector 18. Many different types of optical connectors can be used depending upon the needs of a customer ordering the laser module 10.

In FIG. 1, a support assembly is also shown. The support assembly is fully described in co-pending U.S. patent application Ser. No. 09/173,283, the disclosure of which is herein incorporated by reference. The support assembly retains the laser module 10 in a set position while the laser module 10 is tested and shipped by the manufacturer. The support assembly includes a baseplate 20, a spool 22 and a connector holder 24.

The baseplate 20 contains a laser receptacle 30 that receives the solid state laser 12 of the laser module 10. As such, the laser receptacle 30 holds the solid state laser 12 in a known fixed position on the baseplate 20. The connector holder 24 receives the optical connector 18 of the laser module 10. The connector holder 18 attaches to the top surface of the baseplate 20. Accordingly, the connector holder 24 retains the optical connector 18 at a known fixed position on the baseplate 20.

The spool 22 receives the optical fiber 16 that extends between the solid state laser 12 and the optical connector 18. The spool 22 contains a cylindrical wall 38 around which the optical fiber 16 is wound. The top of the cylindrical wall 38 terminates with a segmented flange 39 that prevents the wound optical fiber 16 from passing over the top of the cylindrical wall 38. A cross element 40 spans across the center of the spool 22 in the same general plane as the flange 39.

Locking tabs 42 extend outwardly from the bottom edge of the cylindrical wall 38. The locking tabs 42 pass through slots 44 in the baseplate 20 and engage the bottom surface of the baseplate 20. The slots 44 are disposed at various points on the baseplate 20. The slots 44 are positioned and shaped to receive the locking tabs 42 on the bottom of the spool 22. As the spool is attached to the baseplate 20, the locking tabs 42 pass through the slots 44. As the spool 22 is rotated, the locking tabs 42 engage the bottom surface of the baseplate 20, thereby creating a mechanical connection between the spool 22 and the baseplate 20.

The spool 22 does not have a flange at its bottom end. Accordingly, before the spool 22 is attached to the baseplate 20, there is no physical barrier that prohibits the wound optical fiber 16 from falling off of the cylindrical wall 38 of the spool 22. This makes the proper winding of the optical fiber 16 onto the spool 22 very difficult and time consuming.

Figure 2:
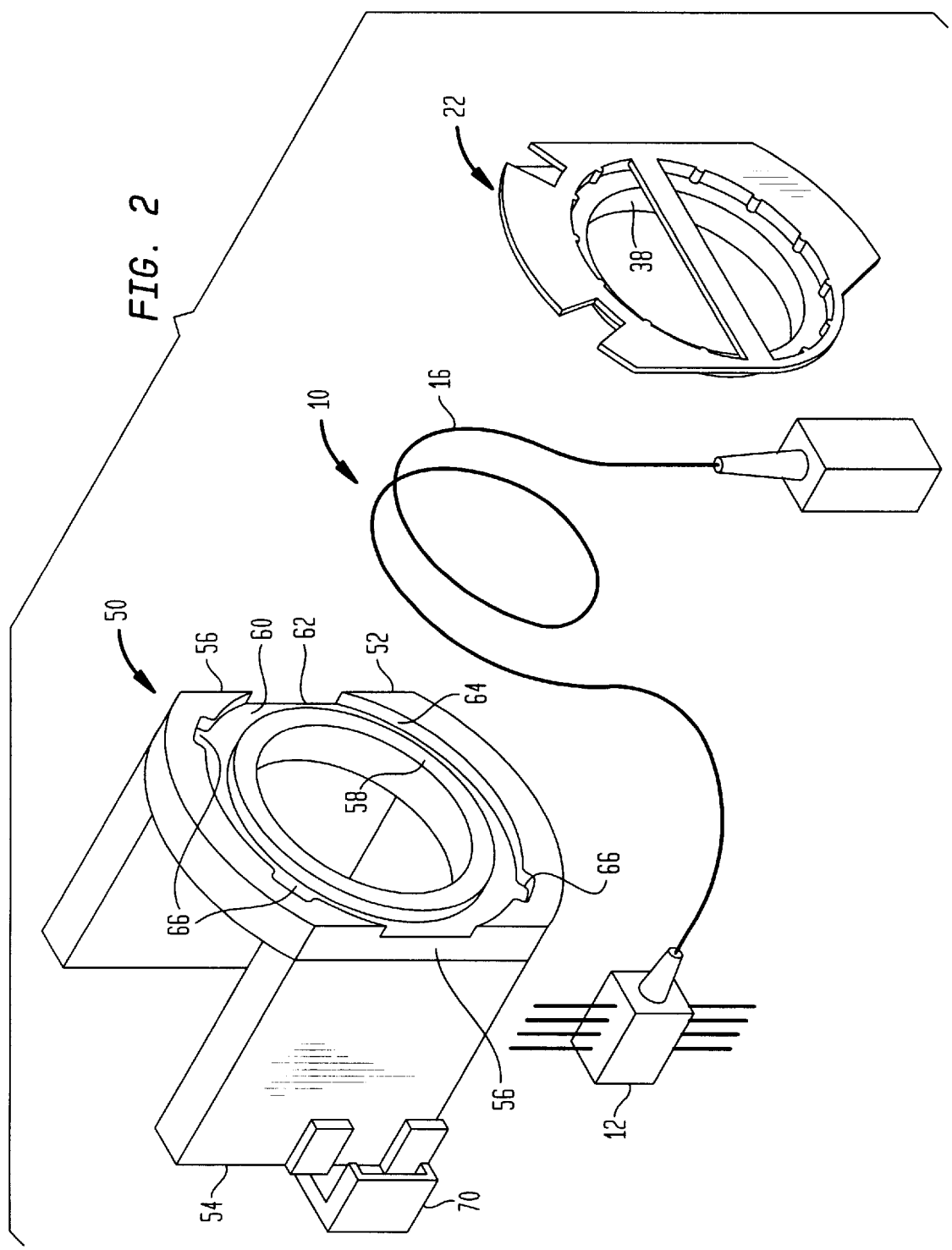
FIG. 2 is an exploded view of the exemplary embodiment of a spool support assembly shown in conjunction with a laser module and the spool of a testing support device.

Referring to FIG. 2, a spool support assembly 50 used to assist winding the optical fiber 16 onto the spool 22 is shown. The spool support assembly 50 contains a top surface 52 that is configured to receive the previously described optical fiber spool 22. Once connected to the spool support assembly 50, a person can wind an optical fiber 16 onto the spool 22 in a simplified manner, as will be later described. Once the optical fiber 16 is wound onto the spool 22, the spool 22 can be removed from the spool support assembly 50 and can be attached to the baseplate 22 (FIG. 1) of the support device shown in FIG. 1.

The spool support assembly 50 has a top surface 52 that is supported by at least one side surface 54. The top surface 52 of the spool support assembly 50 is shaped as a truncated circle. That is, the top surface 52 of the spool support assembly 50 is generally circular in shape, except for two opposing side edges 56 that are truncated and are straight. The straight side edges 56 of the top surface 52 are parallel being that they are directly opposite each other in position.

An annular hub 58 extends outwardly from the center of the top surface 52 of the spool support assembly 50. The annular hub 58 is cylindrical in shape having two open ends. The diameter of the annular hub 58 is sized to pass into the center of the cylindrical wall 38 of the spool 22.

A groove 60 is formed in the top surface 52 of the spool support assembly 50 around the base of the annular hub 58. The groove 60 is wide enough to receive the cylindrical wall 38 of the spool 22 when the spool 22 is attached to the spool support assembly 50. Accordingly, when the spool 22 is placed on the top surface 52 of the spool support assembly, the annular hub 58 passes into the center of the spool 22 and the cylindrical wall 38 of the spool 22 passes into the groove 60 surrounding the annular hub 58.

The circular path of the groove 60 intersects the straight side edges 56 of the top surface 52 of the spool support assembly 50. The inner wall 62 of the groove 60 is uninterrupted and completes a full circle. The outer wall 64 of the groove 60 is not complete and intersects the straight side edges 56 of the top surface 52. As a result, when the spool 22 is placed onto the top surface 52 of the spool support assembly 50, the cylindrical wall 38 of the spool 22 protrudes slightly from the straight side edges 56 of the top surface 56.

Locking tabs 42 (FIG. 1) extend from the bottom of the circular wall 38 of the spool 22. Reliefs 66 are formed in the outer wall of the groove in the top surface of the spool support assembly 50. The reliefs 66 are disposed at positions that correspond to the locking tabs 42 (FIG. 1) on the spool 22. Accordingly, when the spool 22 is placed onto the top surface 52 of the spool support assembly 50, the locking tabs 42 (FIG. 1) pass into the reliefs 66. As will be later explained, retention mechanisms are located at the bottom of the reliefs 66 that selectively engage and retain the locking tabs 42 (FIG. 1) when the locking tabs 42 (FIG. 1) are located within the reliefs 66.

Figure 3:
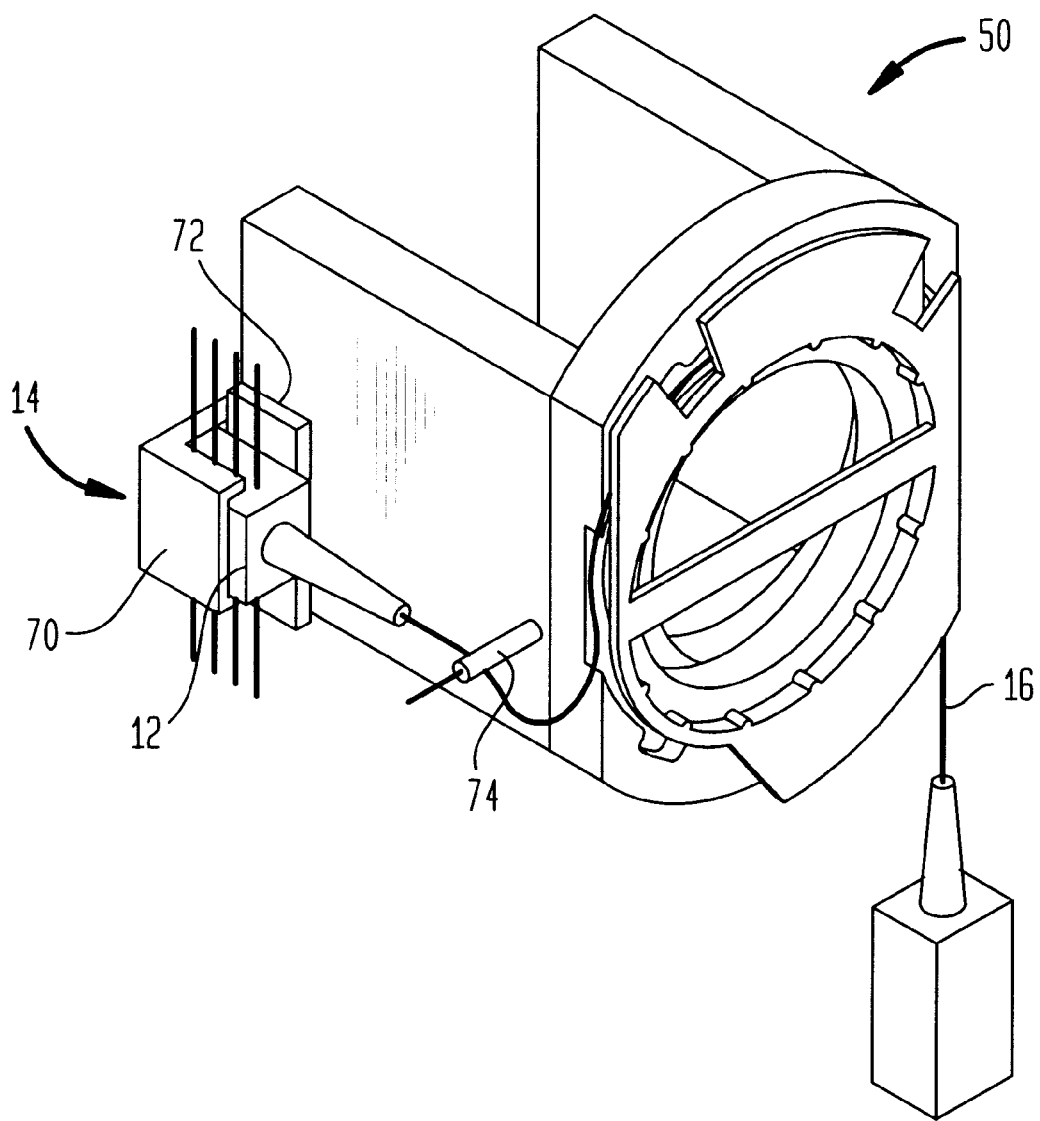
FIG. 3 is an assembled perspective view of the embodiment of FIG. 2.

A laser receptacle 70 is positioned on the side of the spool support assembly 50. The laser receptacle 70 is sized to receive the solid state laser 12 of the laser module 10. Referring to FIG. 3, it can be seen that the laser receptacle 70 receives the solid state laser 12. Support elements 72 are located at the sides of the laser receptacle 70. The support elements 72 support the conductive leads 14 of the solid state laser 12 and prevent the conductive leads 14 from being bent or otherwise damaged when within the laser receptacle 70.

A post 74 extends from the side of the spool support assembly 50. The post 74 is used to change the direction of the optical fiber 16 without causing a kink in the optical fiber 16. As the solid state laser 12 is placed into the laser receptacle 70 on the spool support assembly, the optical fiber 16 extends directly away from the top of the solid state laser 12. As the optical fiber 16 passes next to the post 74, the optical fiber 16 is turned and is wound around the spool 22.

Figure 4:
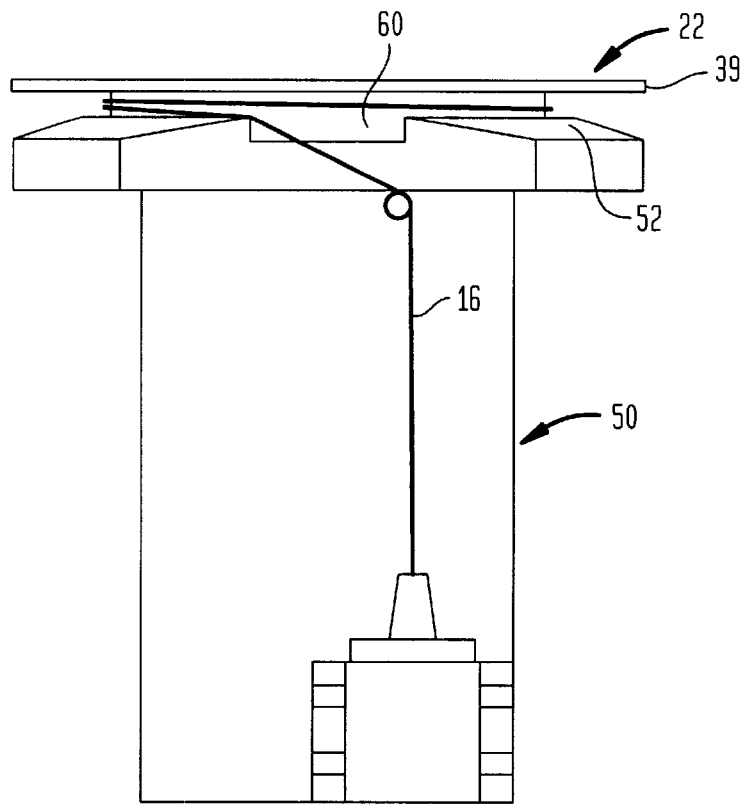
FIG. 4 is side view of the embodiment of FIG. 2.

Referring to FIG. 4, it can be seen that the top surface 52 of the spool support assembly 50 is beveled. After the spool 22 is connected to the spool support assembly 50, the beveled top surface 52 acts as a bottom flange to the spool 22. Accordingly, as the optical fiber 16 is wound onto the spool 22, the optical fiber 16 cannot fall past the bottom of the spool 22. The bevel of the top surface 52 of the spool support assembly 50 helps a person properly position the optical fiber 16 between the beveled top surface 52 and the top flange 39 of spool 22 as the optical fiber 16 is wound.

The optical fiber 16 can be manually wound around the spool 22 as the spool 22 is held on the spool support assembly 50. Conversely, the optical fiber 16 can be wound around the spool 22 by rotating the spool support assembly 50. Both winding procedures can be performed in either a manual winding method or in an automated winding method. Regardless of how the optical fiber 16 is wound, it can be seen that as the optical fiber 16 is wound, the wound fiber protrudes slightly from the straight sides of the spool support assembly 50. After the optical fiber 16 is fully wound, a person can grip the spool with his/her hand in the area where the spool support groove 60 is exposed. As a person grips the spool 22, that person can grip the exposed portions of the optical fiber 16 that are wound around the spool 22. Consequently, as a person pulls the spool 22 away from the spool support assembly 50, the optical fiber 16 is manually held in place on the spool 22. The optical fiber 16 is therefore prevented from falling away from the spool 22 and unwinding.

Figure 5:
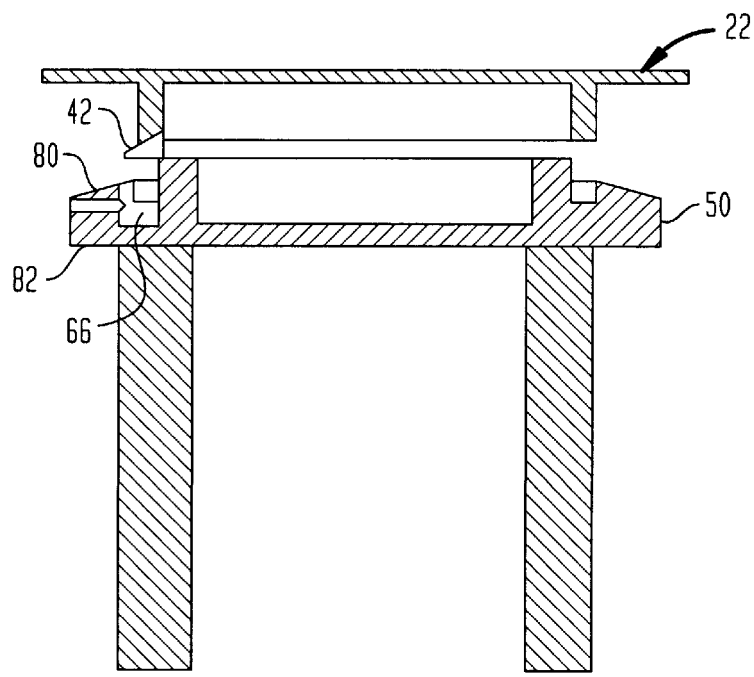
FIG. 5 is a cross-sectional view of the embodiment of FIG. 2.

Referring to FIG. 5, it can be seen that a small spring 80 biases a ball bearing 82 into the area of relief 66 on the spool support assembly 50 that receives the locking tabs 42 of the spool 22. The ball bearings 82 can be retracted out of the areas of relief 66 if they experience a force that overcomes the bias of the small spring 80. The ball bearings 82 engage the locking tabs 42 that extend from the spool 22 when the spool 22 is attached to the spool support assembly 50. The ball bearings 82 retain the locking tabs 42, thereby preventing the spool 22 from falling away from the spool support assembly 50 if turned sideways or upside down. When the spool 22 is grasped and pulled away from the spool support assembly 50, the ball bearings 82 retract and the spool 22 is free to move away from the spool support assembly 50.

Since the shown embodiment of the spool support assembly is used to retain a laser module, it is preferable that the spool support assembly be fabricated from a static dissipative material to prevent the build up of a harmful electrostatic charge. As a result, the spool support assembly is preferably fabricated from a conductive material such as metal or a conductive plastic.

It will be understood that the embodiment of the present invention specifically shown and described is merely exemplary and that a person skilled in the art can make alternate embodiments using different configurations and functionally equivalent components. For example, the support for the top surface can have any configuration. Similarly, the shape and position of the various elements on the baseplate can be varied to meet the needs of a specific application. All such alternate embodiments are intended to be included in the scope of this invention as set forth in the following claims.

What is claimed is:

1. An assembly comprising:
   a spool support having a top surface, wherein said top surface has opposing side edges;
   a cylindrical hub extending upwardly from said top surface;
   a groove disposed in said top surface of said spool support around said cylindrical hub, wherein said groove has an continuous inner wall defined by said cylindrical hub and an incomplete outer wall that intersects said opposing side edges of said top surface.

2. The assembly according to claim 1, wherein said top surface of said spool support has a peripheral edge and said top surface is beveled between said peripheral edge and said groove.

3. The assembly according to claim 1, further including enlarged relief areas disposed in said top surface of said spool support, wherein said enlarged relief areas intersect said groove at various points round said groove.

4. The assembly according to claim 3, further including retention mechanism disposed within each of said enlarged relief areas, wherein said retention mechanisms retain specific elements placed within said enlarged relief areas.

5. The assembly according to claim 1, wherein said spool support has a side surface and a laser receptacle is attached to said side surface, said laser receptacle being sized to receive a solid state laser of a laser module.

6. The assembly according to claim 5, further including at least one post extending from said side surface of said spool support between said laser receptacle and said top surface.

7. The assembly according to claim 1, wherein said spool support is fabricated from a static dissipative material.

8. The assembly, comprising:
   i) a spool having:
      a cylindrical wall with a top end and a bottom end;
      a flange radially extending from at least a portion of said top end of said cylindrical wall; and
   ii) a spool support for supporting said spool as a flexible element is wound around said spool, said spool support comprising:
      top surface having opposing side edges;
      a cylindrical hub extending upwardly from said top surface;
      a generally circular groove disposed in said top surface of said spool support around said cylindrical hub, said
      groove having an continuous inner wall defined by said cylindrical hub and an incomplete outer wall that intersects said opposing side edges of said top surface, wherein said groove is sized to receive said bottom
      end of said cylindrical wall of said spool therein.

9. The assembly according to claim 8, further including locking tabs extending from said bottom end of said cylindrical wall of said spool.

10. The assembly according to claim 9, further including reliefs disposed in said top surface of said spool support, wherein said reliefs are sized to receive said locking tabs therein.

11. The assembly according to claim 10, further including a retention mechanism disposed in each of said reliefs for selectively engaging said locking tabs of said spool when said locking tabs are advanced into said reliefs.

12. The assembly according to claim 8, wherein said top surface of said spool support has a peripheral edge and said top surface is beveled between said peripheral edge and said groove.

13. The assembly according to claim 8, further including an annular hub extending from said top surface, wherein said groove is disposed around said annular hub.

14. The assembly according to claim 8, wherein said groove in said top surface of said spool is defined by an inner wall and an outer wall, wherein said inner wall of said groove completes a circular path and said outer wall of said groove intersecting said side edges of said top surface.

* * * * *